United States Patent
Bieker et al.

(10) Patent No.: US 8,504,225 B2
(45) Date of Patent: Aug. 6, 2013

(54) DETERMINING THE REMAINING SERVICE LIFE OF A VEHICLE COMPONENT

(75) Inventors: Guido Bieker, Kirchhundem (DE); Ralf Heckmann, Heidelberg (DE); Mike Baert, Sint-Andries (BE); Marc Breemeersch, Menen (BE)

(73) Assignee: Bombardier Transportation GmbH, Berlin (DE)

( * ) Notice: Subject to any disclaimer, the term of this patent is extended or adjusted under 35 U.S.C. 154(b) by 432 days.

(21) Appl. No.: 12/738,921

(22) PCT Filed: Oct. 16, 2008

(86) PCT No.: PCT/EP2008/063951
§ 371 (c)(1), (2), (4) Date: Sep. 2, 2010

(87) PCT Pub. No.: WO2009/053303
PCT Pub. Date: Apr. 30, 2009

(65) Prior Publication Data
US 2010/0318246 A1    Dec. 16, 2010

(30) Foreign Application Priority Data
Oct. 24, 2007    (DE) .......................... 10 2007 051 126

(51) Int. Cl.
*E01B 35/06* (2006.01)
*B61K 9/08* (2006.01)
*G01M 17/08* (2006.01)

(52) U.S. Cl.
USPC ............. 701/19; 701/29.1; 701/33.4; 702/34; 702/184

(58) Field of Classification Search
USPC ............. 701/19, 29.1, 29.4, 31.4, 33.4, 29.7; 702/34, 184; 340/438, 457.4; 708/160
See application file for complete search history.

(56) References Cited

U.S. PATENT DOCUMENTS

| 5,579,013 | A | 11/1996 | Hershey et al. |
| 2005/0049835 | A1 | 3/2005 | Mayer et al. |
| 2006/0095179 | A1 | 5/2006 | Schneider et al. |
| 2010/0306001 | A1 * | 12/2010 | Discenzo et al. ............... 705/7 |

FOREIGN PATENT DOCUMENTS

| DE | 10144076 A1 | 3/2003 |
| DE | 10257793 A1 | 7/2004 |
| EP | 0707196 A2 | 4/1996 |
| WO | 00/70148 A1 | 11/2000 |
| WO | 2004022406 A1 | 3/2004 |

\* cited by examiner

Primary Examiner — Tan Q Nguyen
(74) Attorney, Agent, or Firm — The Webb Law Firm (57) ABSTRACT

Method for determining the remaining service life of a component of a vehicle, in particular a railway vehicle, operated on at least one predefined track section of a track network, wherein the remaining service life is determined for a vehicle component of the vehicle mechanically stressed by the interaction between the vehicle and the track section, after a usage interval of the at least one track section, wherein the remaining service life of the vehicle component is determined from a prior loss of service life preset at the beginning of the usage interval for the vehicle component and from a current loss of service life of the vehicle component associated with the usage interval, and wherein the current loss of service life is determined using an actual measured usage of the at least one track section by the vehicle and a relative loss of service life related to the actual usage of the at least one track section, wherein the relative loss of service life has been determined in advance for the at least one track section and at least the type of the vehicle.

38 Claims, 1 Drawing Sheet

DETERMINING THE REMAINING SERVICE LIFE OF A VEHICLE COMPONENT

BACKGROUND OF THE INVENTION

1. Field of the Invention

The present invention relates to a method for determining the remaining service life of a vehicle component of a vehicle, in particular a railway vehicle, operated on at least one predefined track section of a track network, wherein the remaining service life is determined for a vehicle component of the vehicle mechanically stressed by the interaction between the vehicle and the track section, after a usage interval of the at least one track section. The remaining service life of the vehicle component is determined from a prior loss of service life preset at the beginning of the usage interval for the vehicle component and from a current loss of service life of the vehicle component associated with the usage interval. The invention further relates to a corresponding system for determining the remaining service life of a vehicle component. Finally, it relates to a measuring vehicle, which supplies corresponding measurement values for determining the remaining service life of such a vehicle component.

2. Description of the Related Art

The components of vehicles, in particular such vehicle components which are subject to dynamic stress, are typically designed in respect to their endurance limit for a certain service life that can be preset. Typically, for this design, theoretical stress to be expected on the vehicle component is estimated in conjunction with corresponding safety factors. The theoretical stress to be expected in this case typically results from a conglomerate composed of empirical values from different load cases, which may occur in operation of the vehicle.

Since, during the development of the vehicle, typically no detailed assertions can be made about the later actual loading of the vehicle and thus the actual stresses on the vehicle components, usually extreme load cases have to be considered (though they rarely arise, but are nevertheless theoretically possible) in order to avoid premature failure of the vehicle component should such extreme load cases actually occur. In particular with safety-relevant vehicle components, correspondingly high safety factors are usually also applied. Commensurate rules for designing the vehicle components are frequently stipulated by law or (in particular in connection with public passenger and freight traffic) by regulations of the vehicle operator.

Thus, for example, railway vehicles are dimensioned according to international regulations and technical specifications with respect to their strength and safety requirements. Related to the strength these are the loading and load changes which the vehicle has to withstand without damage over its service life. Running safety certifications are established on the basis of a defined track situation and the vehicle parameters. In the case of all observations, the interaction between track and vehicle is crucial as to whether the certifications maintain their validity. If, due to deviation of the track situation as a result of increasingly poor maintenance, the loading changes and/or the amount of loading alter, then this leads to the possibility of damage to the components, in particular the bogies, occurring in the form of cracks, before the end of the planned service life. Cracks represent an operating risk which usually requires very costly inspection of the vehicle components (with crack control) of the vehicle fleet so that it can be kept in operation (possibly after damaged components have been replaced).

In view of this, a maximum theoretical service life is usually specified in the form of a certain maximum operating performance distance (for example in kilometers traveled or the like) for vehicle components which are subject to dynamic stress due to the interaction between the vehicle and the track on which it runs. From the operating performance consumed by the vehicle at a certain time (for example the kilometers traveled so far), the remaining service life of the vehicle component concerned is then usually estimated as the difference between the maximum operating performance and the operating performance actually consumed.

The problem here is that a vehicle is actually subjected in operation to a conglomerate of load cases, which perhaps substantially deviates from the theoretical conglomerate of load cases assumed during its development. Therefore, a vehicle component may have been subjected over its previous usage period both to substantially higher and substantially lower stress than was assumed during its development.

Thus, on the one hand, cases may arise wherein the actual service life of the vehicle component has not yet been reached (the vehicle component could thus continue to be used quite safely) although the theoretical service life (for example in the form of a maximum operating performance) is reached. This is not critical from a safety point of view; however, from an economic point of view it is disadvantageous for the operator of the vehicle.

If the end of the theoretical service life has been reached, for example, the vehicle component concerned must usually be replaced or it must be checked whether the theoretical service life of the vehicle component can be extended. While calculation of the remaining service life of a vehicle component subjected to visible wear and tear usually entails comparatively few problems, vehicle components without such visible wear and tear frequently have to undergo very costly non-destructive testing.

The situation is considerably more critical if the vehicle component is subjected in actual operation to stresses, which are considerably greater than those which were used during its development. In this case, the possibility exists that the actual service life ends, that is to say the vehicle component fails, before its theoretical service life has been reached. In particular in the case of safety-relevant vehicle components that are not subject to wear and tear which can be easily detected, such situations must be avoided at all cost.

An important factor of influence for the loads actually arising during operation of the vehicle and the stresses on the vehicle components resulting therefrom is the condition of the track, on which the vehicle is operated. In order to record this condition, it is known from WO 00/70148 A1 and U.S. Pat. No. 5,579,013, for example, inter alia to arrange acceleration sensors and distance sensors on the vehicle in order to record the interaction between the vehicle and the track and to draw conclusions about the condition of the track. Although with the data concerning the track gathered in such a way, needs-based planning in respect to its usage or maintenance can be carried out for the latter. However, this does not provide a method to solve the aforesaid problems in connection with determining the remaining service life of vehicle components.

In U.S. Pat. No. 5,579,013 it is also proposed to draw conclusions about the condition of certain components of the vehicle, for example the wheels, from the measurement signals of the sensors. Although it is therefore possible to detect damage to certain components which, on the one hand, have measurable influence on the dynamic condition of the vehicle (consequently therefore have corresponding influence on the measurement values of the sensors used), damage which entails no such dynamic influence cannot be detected.

Therefore, the object of the present invention is to provide a method, system and measuring vehicle of the kind specified initially, which overcomes the drawbacks mentioned above and in particular enables the remaining service life of vehicle components to be determined more simply and at the same time with sufficient precision at arbitrary points in time.

SUMMARY OF THE INVENTION

The present invention is based on the technical teaching that the actual remaining service life of vehicle components can be determined at arbitrary points in time if the loss of service life of the vehicle component concerned through the actual usage of the vehicle is correlated with the track section (s) actually used and the stresses on the vehicle component resulting therefrom. By correlation with the track section used, it is possible to make a more precise assertion in regard to the stresses on the respective component actually arising in operation of the vehicle and to determine therefrom a more precise actual loss of service life through the actual usage.

In accordance with one aspect of the invention it is provided in this respect that the current loss of service life is determined using an actual measured usage of the at least one track section by the vehicle and a relative loss of service life related to the actual usage of the at least one track section, wherein the relative loss of service life has been determined in advance for the at least one track section and at least the type of the vehicle.

It has turned out, for example, that by measurements on the vehicle itself or on one or more suitable comparison vehicles (preferably under real operating conditions) when negotiating the track sections concerned, reliable assertions correlated with the track section concerned can be made in respect to the actual stresses on the component concerned resulting from the usage of the track section. An actual relative loss of service life due to the usage of the track section can be determined therefrom for the respective vehicle component (e.g. a loss of service life per usage of the track section concerned).

Likewise it is possible, for example, to determine the relative loss of service life totally or partially in a theoretical way, for example using corresponding simulation calculations or the like. This is possible in particular if a commensurately precise computer model of both the vehicle itself and the track section concerned is available.

Preferably the relative loss of service life is determined using measurements, representative of the stress on the vehicle component, which were taken on a measuring vehicle during at least one transit through the at least one track section, since as a result particularly reliable assertions about the actual stresses on the respective vehicle component are possible in a relatively simple way.

The relative loss of service life in this case does not have to be determined using the vehicle itself as measuring vehicle. Rather, a comparison vehicle can also be used for the corresponding measurements if a commensurately precise correlation between the loads arising in operation (and the stresses on the vehicle components resulting therefrom) is known for both vehicles. Preferably, the relative loss of service life is determined using measurements on a comparison vehicle of the same type, since in this case a particularly simple correlation between the in vehicle and the comparison vehicle is possible.

The relative loss of service life can be determined using one single recording operation (possibly comprising a plurality of test runs over the respective track section) on the track section concerned. In the case of advantageous variants of the invention, however, it is provided that the condition, changing over time through wear and tear and other influences, of the respective track section and the influence on the relative loss of service life resulting therefrom are considered.

Accordingly, test runs with one or more measuring vehicles are undertaken preferably continuously over time, in order to keep the relative loss of service life permanently up to date.

When determining the remaining service life, preferably it is therefore provided that the relative loss of service life is dependent on the point in time of usage and, when determining the loss of service life, the point in time of a partial quantity of actual usages of the at least one track section by the vehicle is considered in each case. In other words, possibly depending on the temporal resolution for the respective relative loss of service life (consequently therefore depending on the periodic intervals between different values for the relative loss of service life) a different relative loss of service life is associated with each or a plurality of usages depending on their point in time. In this case it goes without saying that a corresponding value for the relative loss of service life may possibly also be determined for each point in time of usage by interpolation.

The respective measurements of the measuring vehicle can be taken during separate test runs with representative loading of the measuring vehicle, which corresponds to typical loading of the vehicle in normal transport operation. Preferably, however, the measurements, representative of the stress on the vehicle component, are already taken on a vehicle in normal (for example regular) transport operation. This has the advantage that particularly realistic measurement results are obtained.

As previously mentioned, the measurements do not necessarily have to be taken on the vehicle, for whose vehicle component the remaining service life is to be determined. Rather, the measurements can also be taken on another vehicle, in particular also on a vehicle of another vehicle type and then converted by a corresponding known correlation between the stresses on the two vehicles. Preferably, the measurements, representative of the stress on the vehicle component, are taken on a comparison vehicle, used as a measuring vehicle, of the same vehicle type, in order to permit particularly simple transfer to the vehicle actually to be observed.

In the case of preferred variants of the method according to the invention, it is provided that, in addition to calculating the remaining service life of the vehicle component concerned for the usage of the vehicle on the track section used so far, at least one comparative calculation of the remaining service life of the vehicle component concerned is carried out with the vehicle being used on a different track section. As a result, optimised planning of the usage of the vehicles in respect to the useful life of the vehicles and/or their components is possible in an advantageous way.

In accordance therewith, preferably it is provided that the relative loss of service life for the at least one track section is a first relative loss of service life for the at least one first track section, the remaining service life determined using the first relative loss of service life is a first remaining service life for the further operation of the vehicle on the at least one first track section and using a second relative loss of service life for at least one second track section of the track network, a second remaining service life for the further operation of the vehicle on the at least one second track section is determined, wherein the second relative loss of service life has been determined in advance for the at least one second track section and at least the type of the vehicle. In this context, it goes without saying that the second relative loss of service life likewise can be determined in the way described above.

The remaining service life can be determined without considering the future progression in the relative loss of service life. In the case of preferred variants of the method according to the invention, however, it is provided that the expected progression in the relative loss of service life of the track section concerned is considered. Consequently an increase in the relative loss of service life through expected wear-contingent degradation of the track can therefore be considered when determining the remaining service life, for example. In other words, when determining the remaining service life, it is thus possible in an advantageous way to also consider the expected progression in the condition of the respective track section (for example, degradation by wear and tear or else improvements through scheduled maintenance measures, etc.).

Preferably, it is therefore provided that the relative loss of service life is dependent on the point in time of usage and, when determining the remaining service life, a prognosis for the future progression in the relative loss of service life is used. The prognosis for the future progression in the relative loss of service life can be established in an arbitrary suitable way.

Preferably, the prognosis is determined using a history of the relative loss of service life, since particularly simple establishment of a near-reality prognosis is possible from the history.

The measuring device or sensor system on the measuring vehicle is basically configured in an arbitrary suitable way according to the variables to be determined for the respective vehicle component and influencing the service life of the vehicle component. Typically, acceleration sensors, distance sensors, acoustic sensors and any other sensors which can provide information about dynamic loads on the vehicle, are used. The sensors concerned may be arranged at an arbitrary suitable place in the vehicle (preferably close to the vehicle component to be observed). Depending on the kind of stresses to be determined, it may be expedient to measure after the primary suspension, thus for example on the running gear frame. In addition, it can be particularly informative if the sensors concerned are arranged as close as possible to the contact areas between vehicle and track in order to obtain as undistorted an image as possible of the interaction between the vehicle and the track.

Preferably, it is therefore provided that the measuring vehicle has a plurality of wheels and components supported thereon via a suspension and the measurements, representative of the stress on the vehicle component, are taken using at least one acceleration sensor and/or at least one acoustic sensor and/or at least one distance sensor connected in parallel to the suspension between the wheels and the components supported thereon. Particularly good assertions are possible in respect to the interaction between vehicle and track if the measuring vehicle has a running gear with a plurality of wheels and a running gear frame supported via a primary suspension on wheel bearings of the wheels, and the measurements, representative of the stress on the vehicle component, are taken using at least two distance sensors, connected in parallel to the primary suspension between the wheels and the running gear frame. Here it is particularly advantageous if in each case at least one corresponding distance sensor is associated with at least four wheels in each case combined into two wheel units (thus for example single wheel pairs or wheel sets), since as a result consideration can also be given to the twisting of the track in a simple way.

The vehicle component whose remaining service life is to be determined can basically be an arbitrary component of the vehicle stressed by the interaction between vehicle and track. Preferably, the vehicle component whose remaining service life is determined is a running gear component of the vehicle, since in connection with such running gear components, on the one hand, particularly good assertions can be made in respect to their remaining service life and, on the other hand, these components are usually important, safety-relevant components of the vehicle.

The present invention further relates to a system for determining the remaining service life of a vehicle component of a vehicle, in particular a railway vehicle, operated on at least one predetermined track section of a track network, with a data-processing device, which is designed to determine remaining service life data, which are representative of the remaining service life of a vehicle component of the vehicle mechanically stressed by the interaction between the vehicle and the track section, after a usage interval of the at least one track section. The remaining service life data of the vehicle component are determined from prior loss of service life data and current loss of service life data, which are stored in the data-processing device, wherein the prior loss of service life data are representative of a prior loss of service life preset for the vehicle component at the beginning of the usage interval and the current loss of service life data are representative of a loss of service life of the vehicle component associated with the usage interval. The data-processing device according to the invention is designed to determine the current loss of service life using usage data and relative loss of service life data, which in each case are stored in the data-processing device, wherein the usage data are representative of a previously measured actual usage of the at least one track section by the vehicle, the relative loss of service life data are representative of a relative loss of service life related to the actual usage of the at least one track section and the relative loss of service life data have been determined in advance for the at least one track section and at least the type of the vehicle. With this system the advantages and variants, described above, can all be realised to the same extent, so that in this connection reference is made to the above statements. In particular the method according to the invention described above can be implemented with the system according to the invention.

The data-processing device in this case basically can be arranged in an arbitrary place. For example, it is possible to arrange the data-processing device in a central place (for example in a data control centre) in order to permit the remaining service life and operational planning of the individual vehicles to be supervised centrally in this place, for example. It goes without saying, however, that the data-processing device can also be arranged de-centrally. For example it is also possible to install the data-processing device in the respective vehicle itself in order to have the corresponding information about the remaining service life of the vehicle components available in the vehicle. In this context, it goes without saying that in this case the respective remaining service life can then be transmitted in a suitable way to a corresponding central place for carrying out operational planning or the like.

Preferably the system according to the invention comprises at least one measuring vehicle (for example the vehicle and/or a corresponding comparison vehicle) with a measuring device that can be connected to the data-processing device. The measuring device (for the purpose of determining the relative loss of service life) is then designed to take measurements, representative of the stress on the vehicle component, on the measuring vehicle during at least one transit through the at least one track section.

The data gathered by the measuring device can already be processed totally or partially in the measuring device. Preferably, the measuring device is designed to gather stress data, representative of the stress on the vehicle component, and to pass these on to the data-processing device. The data-processing device in this case is designed to determine the relative loss of service life data using the stress data.

The measuring device basically can be designed in an arbitrary suitable way. Preferably, it is designed as a hierarchically structured system with a plurality of levels, which can communicate with one another via corresponding interfaces. Preferably, the measuring device therefore comprises at least one sensor, a first control device and a second control device, wherein the at least one sensor is designed to gather and pass the stress data on to the first control device, the first control device is designed to collect, pre-process and pass the stress data on to the second control device, and the second control device is designed to collect, further process and pass the stress data on to the data-processing device.

The individual levels of the measuring device can communicate with one another in an arbitrary suitable way. Preferably, the at least one sensor and the first control device are connected by a first data bus and/or the first control device and the second control device are connected by a second data bus, since such a connection via a data bus (for example a CAN bus) can be formed in a particular simple and flexible manner. In particular, it is thereby possible to add further or other sensors to the measuring device retrospectively.

It is also particularly advantageous in this connection to arrange the first control device spatially close to the at least one sensor device, since the complexity of the wiring can be substantially reduced as a result.

In order to keep the cost for subsequent data-processing to a minimum and to achieve high flexibility in the design of the measuring device, the first control device is preferably designed to convert the stress data of the at least one sensor into a standard format and to pass these on formatted in such a way.

Preferably, the measuring device is of modular construction in order to permit simple adaptation to various measurement tasks. For this purpose the measuring device preferably comprises a plurality of sensors and a plurality of different stress data to be gathered can be predefined. The first control device, as a function of a predefined stress data to be gathered, is then designed to trigger different sensors of the plurality of sensors in order to pass on the stress data recorded by the latter. Preferably, at least one of the sensors is designed as an intelligent sensor, in which corresponding scaling data are stored, on the basis of which its measurement signals can be converted into measurement data that are standardised accordingly.

In order to be able to associate data gathered by the measuring device with a position, preferably it is provided that the measuring device comprises a position-recording device, which is designed to record the position of the measuring vehicle at the point in time of gathering the respective stress data and to link the stress data with a position identifier. As a result, it is possible from the data gathered not least to obtain detailed assertions about the current condition of the track section negotiated.

Furthermore, the measuring device preferably comprises a time-recording device, which is designed to record the point in time of gathering the respective stress data and to link the stress data with a time identifier. As a result it is possible, in an advantageous way, to compile a history of the condition of the measuring vehicle, but in particular also of the track section and to use this for subsequent evaluations.

The present invention further relates to a measuring vehicle, in particular a railway vehicle, for a system according to the invention, with a running gear having at least two wheel units, which in each case comprise two wheels, a vehicle unit supported via a suspension on the wheel bearings of the wheels of both wheel units and a measuring device. The measuring device, for gathering stress data of a vehicle component of the measuring vehicle, has at least four distance sensors, wherein at least one proximity sensor, which is connected in parallel to the suspension between the respective wheel and the vehicle unit, is associated with each of the wheels of both wheel units. As a result, on the one hand, the variants and advantages described above can all be realised to the same degree, so that in this respect reference is made to the above statements.

In this context, it goes without saying that ultimately the vehicle unit may be an arbitrary unit. Thus, for example, it can be provided that the wheel units concern single axle running gears on which, as vehicle unit, the superstructure of the vehicle rests. Likewise the vehicle unit can be a running gear frame (for example a running gear frame) which, on the one hand, is supported on both wheel units and on which, on the other hand, the superstructure of the vehicle then rests.

Irrespective of determining the remaining service life of a vehicle component, however, the current condition of the track section negotiated can be established particularly accurately with such a measuring vehicle and the track sections of a track network can also be monitored and their usage or maintenance planned in an advantageous way.

The present invention can be carried out in connection with any arbitrary vehicles which regularly operate on predefined track sections of a track network. These may, for example, be motor vehicles which are used for urban public transport on predefined routes. The invention can be used particularly advantageously in connection with railway vehicles, since naturally these usually always run on an exactly defined track section of a track network.

BRIEF DESCRIPTION OF THE DRAWING

Further preferred embodiments of the invention arise from the dependent claims or the following description of preferred exemplary embodiments, which relates to the appended drawings. It is shown in:

DESCRIPTION OF THE PREFERRED EMBODIMENTS

Figure 1:
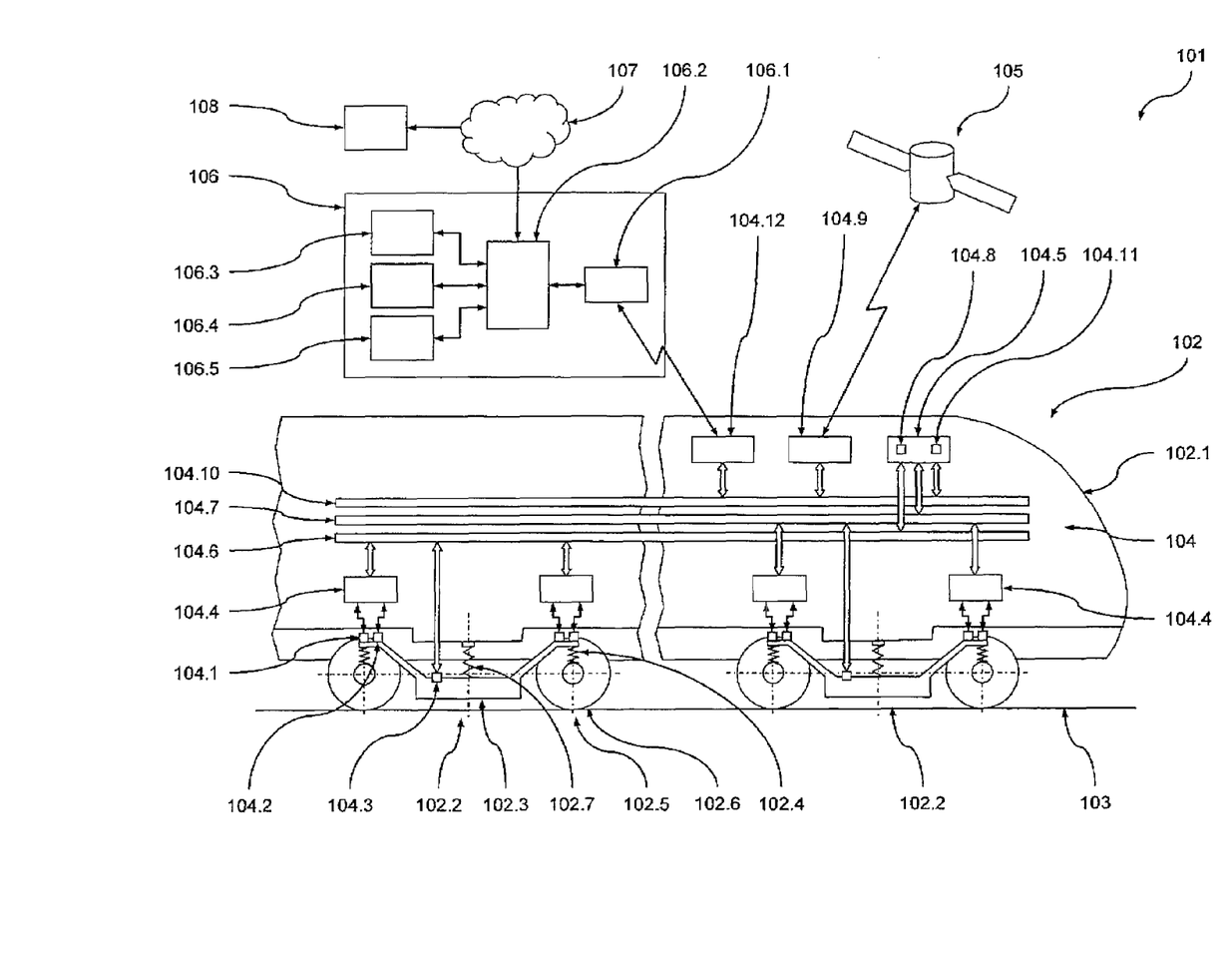
FIG. 1 a schematic side view of a section of a preferred embodiment of the system according to the invention for determining the remaining service life of a component of a vehicle, which comprises a preferred embodiment of the measuring vehicle according to the invention and in which a preferred embodiment of the method for determining the remaining service life of a component of a vehicle according to the invention can be implemented.

With reference to FIG. 1, a preferred embodiment of the system 101 for determining the remaining service life of a component of a vehicle according to the invention, which comprises a preferred embodiment of the measuring vehicle 102 according to the invention, is below. A preferred embodiment of the method for determining the remaining service life of a component of a vehicle according to the invention can be implemented with the system 101.

The measuring vehicle 102 designed as railway vehicle is operated during a test run on a predefined track section 103 of a track network. During these test runs, a series of measurements are carried out on the measuring vehicle 102 which, on the one hand, permits conclusions regarding the current condition of the track section 103 and, on the other hand, conclusions regarding the stress on certain vehicle components of the measuring vehicle 102, which are mechanically stressed by the interaction between the measuring vehicle 102 and the track section 103.

As described below, the data collected in this way, with respect to the condition of the track (so-called track input data), can be used to plan the usage and possibly the maintenance of the track section 103. In particular, track input data collected in this way can be used whenever certain threshold values are exceeded to trigger certain reactions which can be predefined. Thus, for example, it can be provided that, as a function of the degree of degradation in the condition of the track section 103, speed limits can be imposed at certain locations. Likewise, corresponding maintenance measures can be initiated depending on the degree of degradation in condition, as soon as corresponding limit values are exceeded.

As likewise described in more detail below, data gathered via the measurements of the measuring vehicle 102 in respect to the stresses on certain vehicle components can be used according to the invention in order to make, as a function of the actual usage of the track section 103, assertions in respect to the residual remaining service life of these vehicle components. In other words, the data collected in this way can also be used to determine a correlation between the actual usage of the track section 103 and the actual loss of service life resulting therefrom, hence, to determine a relative loss of service life related to the track section 103.

This relative loss of service life can be used not only for components of the measuring vehicle 102. Rather, on the one hand it is also possible to use this relative loss of service life, determined in this way, for determining the remaining service life of corresponding vehicle components of other vehicles of the same type (as the measuring vehicle). Furthermore, these data collected using the measuring vehicle 102 may possibly also be used to make assertions about the remaining service life of corresponding vehicle components of vehicles of another type, provided that a sufficiently precisely defined correlation between the stresses on both vehicles is available.

The measuring vehicle 102 has a wagon body 102.1, which is supported on a plurality of running gears in the form of bogies 102.2. Each bogie 102.2 comprises a bogie frame 102.3, which in each case is supported via a primary suspension 102.4 on two wheel units 102.5. Each wheel unit 102.5 in this case comprises two wheels 102.6 running on opposite rails. The wagon body 102.1 rests on the bogie frame 102.3 via a secondary suspension 102.7.

The measuring vehicle 102 also has a measuring device 104, which has a series of sensors 104.1, 104.2, 104.3 and also a series of first control units 104.4 and a second control unit 104.5. A series of sensors 104.1, 104.2 which are arranged on the bogie frame 102.3 is connected to each first control unit 104.4. The respective first control unit 104.4 is likewise arranged on the associated bogie frame 102.3 (which is not illustrated in FIG. 1 for reasons of clarity) and also connected by a data bus 104.6 or 104.7 (for example a so-called CAN bus) to the second control unit 104.5 arranged in the wagon body 102.1.

This configuration has the advantage that, on the one hand, only comparatively short wiring is necessary between the sensors 104.1 and 104.2 and the associated first control unit 104.4 (which in each case are arranged on the bogie frame 102.3). On the other hand, only few connecting lines are required between the bogie 102.2 and the superstructure 102.1 owing to the bus connection between the respective first control unit 104.4 and the second control unit 104.5.

It goes without saying, however, that in the case of other variants of the invention it can also be provided that a bus connection can already exist between the sensors (then designed accordingly) and the first control unit. Likewise, it can naturally also be provided that the first control unit is omitted and its function (described in more detail below) is carried out in the second control unit.

The sensors 104.1 are distance sensors connected in parallel to the primary suspension 102.4 between the bogie frame 102.3 and the wheel bearing of the respective wheel 102.6, which distance sensors record the change in distance between the wheel bearing and the bogie frame 102.3, that is to say the compression of the primary suspension 102.4. Consequently, therefore, four such distance sensors 104.1 are provided for each bogie frame 102.3. It goes without saying, however, that in the case of other variants of the invention it can also be provided that the distance sensors 104.1 can record the change in distance between the wheel bearing of the respective wheel 102.6 and other components supported thereon (102.1, 102.3).

The sensors 104.2 are acceleration sensors which detect the accelerations acting on the bogie frame 102.3 in the spatial directions necessary for the desired measurement.

The sensors 104.3 in the present example are acoustic sensors, which are directly connected to the data bus 104.6 or 104.7. The sensor 104.3 is also able to convert its measurement signals itself into measurement data which are standardised accordingly and to pass these on via the data bus. Bus-capable sensors of this type are used especially whenever data communication with a wider bandwidth is necessary.

It goes without saying that in the case of other variants of the invention fewer sensors or also any further arbitrary sensors (for example, temperature sensors, etc.), which are connected to the first control unit 104.2 or the data bus 104.6 or 104.7, can be provided. Type and number of sensors of the measuring device 104 in this case depend on the desired measurement data which are to be consulted for evaluation. In particular, it goes without saying that in the case of other variants of the invention also only one bogie can be equipped with the sensor system described above.

The respective sensor 104.1, 104.2 is designed as an intelligent sensor with a memory, in which scaling data for the respective sensor 104.1 or 104.2 are stored. Apart from the scaling data, further sensor-related data (e.g. calibration data, diagnostic data, test algorithms etc.), which can be used during operation or maintenance of the sensor, can be entered in the memory of the respective sensor 104.1 or 104.2.

The first control unit 104.4 reads the scaling data from the respective sensor 104.1 or 104.2 and uses these scaling data to convert the measurement signals of the respective sensor 104.1 or 104.2 into measurement data which are standardised and digitised accordingly. This modular construction has the advantage that the measuring device 104 can be easily expanded and adapted to desired measuring algorithms, by exchanging or adding certain sensors.

At specific times (for example when the measuring device 104 is switched on or when any other arbitrary presettable events occur), the second control device 104.5 (possibly via the first control device 104.4) checks the current configuration of the measuring device 104, in particular the status of all sensors 104.1 to 104.3. In this connection, the second control device 104.5 may possibly carry out a test and/or configuration routine that can be preset, with which the measuring device 104 is configured in accordance with corresponding parameters. In particular in the context of a configuration routine of this type, it is possible to define what measurement data of which sensors 104.1 to 104.3 are to be recorded during the current test run.

The second control device 104.5 then, according to a suitable presettable inquiry protocol, during the test run on the track section 103 asks for the desired measurement data from the sensors 104.1 and 104.2 via the first control devices 104.4 or directly from the sensors 104.3. This has the advantage that the measurement data obtained in this way from all sensors 104.1 to 104.3 are temporally synchronised with one another through suitable configuration of the inquiry protocol.

The inquiry protocol can be configured in an arbitrary suitable way. For example, the time of transmitting a corresponding inquiry message can be used as point of reference and the runtimes until the corresponding sensor signal was picked up can be measured in order to establish a temporal relationship between the individual measurement data in this way.

The first control device 104.4 receives the corresponding measurement signals of the sensors 104.1, 104.2 connected thereto, digitises these and links them with identity information and also possibly further sensor-related data of the respective sensor (for example, information about the type of sensor, serial number, scaling data, etc.). The first control device 104.4 may possibly also carry out further pre-processing (for example, filtering, error correction, etc.). The same can also be carried out by the sensors 104.3, which transmit their measurement data directly to the second control device 104.5.

The measurement data edited in this way are processed in the second control device 104.5 according to a presettable protocol. Among other things, fast gathering of the sensor data and also their pre-processing in accordance with preset algorithms take place in the second control device 104.5. Thus, information relevant to the safety and strength of the vehicle 102 about the condition of the track section 103 are extracted in a known way from the sensor data (that is to say from the vehicle reaction) and continuously logged in a suitable format as track input data. Furthermore, pre-processing for example comprises the generation of events (warnings, alarms, error and status messages, etc.), the incrementation of counting processes (so-called rainflow-counting algorithms, for example) regarding the measured variables or those derived from measured variables, the generation of spectra by FFT (fast Fourier transform) from measured data or data derived therefrom, etc.

The data gathered in this way are linked by the second control device 104.5 with a time identifier representative of their time of gathering and also with a position identifier representative of their location of gathering. For determining the time identifier, the second control device 104.5 comprises a correspondingly reliable source of real time 104.8 (for example, a sufficiently regularly synchronised real-time clock or the like).

For determining the position identifier, the measuring device 104 comprises a position-determining device 104.9, which is connected via a further data bus 104.10 (for example, a further CAN bus) to the second control device 104.5. In the present example, the position-determining device is a module 104.9 of a satellite-based position-determining system 105 (for example, GPS, Galileo etc.). It goes without saying, however, that in the case of other variants of the invention any other arbitrary method of position determination can also be used (for example, position determination on the basis of passing certain check-points and measurement of travelling speed, etc.).

In this context, it goes without saying that, in particular when a satellite-based position-determining system is used, the time signal transmitted by this system may possibly be used as time source for establishing the time identifier.

The measurement data produced in this way are first stored as a historical data sequence in a non-volatile manner in a memory 104.11 of the second control device 104.5 (for example, in the form of an embedded database). In this case it goes without saying that further evaluation, whose result can also be stored in the memory 104.11 of the second control device 104.5, can already take place in the second control device according to arbitrary algorithms and criteria which can be preset. The memory 104.11 in this case may be configured in an arbitrary way. Thus, for example, it can be carried out by mass storage (for example, on the basis of CF cards).

If, as mentioned above, certain limit values are exceeded (which entails an alarm as an event), it can be additionally provided that corresponding separate reference data records are stored which identify the corresponding event with sufficient precision. In particular it can be provided that these reference data records are linked with the relevant sections of the historical data sequence, in order to be able to subsequently analyse the situation in the environment of the event logged in this way. In other words, a history of pre-definable temporal length can be compiled in the case of such an alarm, before and after the event concerned and from all or selected sensor data.

Continuously or at any presettable points in time (whenever arbitrary temporal and/or non-temporal events occur), at least selected parts of the data stored in the memory 104.11 are transmitted via a first communication module 104.12 of the measuring device 104 to a remote data control centre 106 which, for this purpose, has a corresponding second communication module 106.1.

The time of the communication may be preset by an arbitrary side. In particular it can be provided that communication is always built up whenever a preset data sequence has been recorded by the vehicle 102. Likewise it can also be provided that communication is established at certain locations on the track section 103, where the build-up of a reliable communication link is guaranteed. Communication is preferably established (at least section wise) in a wireless manner. For this purpose the first communication module 104.12 can be designed as a data-capable mobile phone module (for example, GPRS, UMTS, etc.). It goes without saying, however, that in the case of other variants a local wireless connection (WLAN, Bluetooth, IrDA, etc.), which is then used, for example, at a scheduled stop of the measuring vehicle 102, can be selected.

Finally, it goes without saying that in the case of other variants of the invention data can also be exchanged between the vehicle 102 and the data control centre 106 via a wired connection (for example, LAN, etc.) when the vehicle 102 remains longer at a stop. Likewise, the data can naturally also be exchanged by transferring storage media (CF cards, etc.).

During transmission, correct receipt of the data is acknowledged via a processing unit 106.2 (connected to the second communication module 106.1) of the data control centre 106. The processing unit 106.2 stores the data transmitted by the vehicle 102 in a corresponding memory 106.3 (for example, a database system or the like) of the data control centre 106. After successful acknowledgment, the transferred data can be removed from the memory 104.11 of the measuring device 104. As a result, both multiple transfer of data and loss of data through defective transmission are prevented.

The processing unit 106.2 can be designed in the way of a database server, which is accessible via a communications network 107 (for example, LAN, the internet, etc.) with corresponding authorisation through an external computer 108. Corresponding evaluation algorithms, by which the produced data of the measuring device 104 can be evaluated according to arbitrary criteria, may be available on the database server 106.2 and/or the external computer 108.

Thus, in this way, the track network operator of the track section 103 can obtain detailed information about the current condition of the track section 103, for example. The measuring vehicle 102 is preferably a conventional railway vehicle, which is used in normal regular service on the track section 103 and is only additionally equipped with the measuring device 104. Preferably at least one measuring vehicle 102 equipped in such a manner is used in normal line operation on each track section 103. The track network operator, with the system 101 according to the invention, can thus obtain permanently updated information about the condition of its track network, via access to the database server 106.2, and thus can optimise usage and maintenance planning for its track network.

Depending on agreement with the track network operator, it can also be provided that, if, as described above, it has been established that certain limit values (of the track bed) have been exceeded, the database server 106.2 actively informs the track network operator (for example, by email or the like). In this case information, already correspondingly edited in respect to the time and location (on the track section 103) of the limit value being exceeded, is then preferably included.

Furthermore, with the method according to the invention, the remaining service life of vehicle components of a railway vehicle, which is operated on one or more track sections 103 measured by the measuring vehicles 102, can be determined using the data on the database server 106.2, obtained from the measurement data of the measuring vehicle 102, by means of evaluation algorithms available on the database server 106.2 and/or the external computer 108.

This is described below on the basis of an example for a vehicle operated only on one track section 103. It goes without saying, however, that the remaining service life can also be determined without difficulty in a similar way for the case that the vehicle is operated on a plurality of track sections.

The database server 106.2 in the present example determines data from the measurement data of the measuring vehicle 102, correlated with the track section 103, in respect to the actual stresses, resulting from the usage of the track section 103, on vehicle components (for example, the bogie frame 102.3), which result from the interaction between the measuring vehicle 102 and the track section 103. From this, the database server 106.2 determines an actual relative loss of service life, resulting from the usage of the track section 103 (a loss of service life per usage of the track section concerned, for example), for the respective vehicle component (the bogie frame 102.3, for example).

The database server 106.2 determines the relative loss of service life of the component concerned (the bogie frame 102.3, for example) firstly for the measuring vehicle 102 and enters this as relative loss of service life data record in the memory 106.3. Correlation data, which describe the correlation between the stresses on the vehicle components of the measuring vehicle 102 and the stresses on the corresponding vehicle component of a vehicle of the respective vehicle type, are stored in a further memory 106.4 of the data control centre for a plurality of vehicle types, which are operated on the track network on the track section 103. In other words, with these correlation data, it is possible to determine from the stress on a vehicle component (for example, the bogie frame 102.3), established through the test run(s) of the measuring vehicle 102, the stress on a corresponding vehicle component (the bogie frame, for example) of another vehicle, if the latter negotiates the track section 103 at (approximately) the same time.

In the simplest case, the measuring vehicle 102 and the vehicle for whose component the remaining service life is to be determined are of identical design, so that the stresses on the vehicle component concerned can be assumed to be identical for the measuring vehicle 102 and this vehicle.

Depending on the volume of measurement data available from test runs by the measuring vehicle 102, it can be provided that the relative loss of service life for the measuring vehicle 102 is determined using only one test run at a certain time. Preferably, however, it is provided that the relative loss of service life is determined as an appropriate average of a plurality of test runs, in order to consider the fluctuations in the loading of the measuring vehicle 102 (occurring naturally in normal line operation).

In this context, it goes without saying that preferably such averages are only calculated if, from the analysis described above of the condition of the track section 103 (that is to say analysis of the track situation), it is evident that no inadmissibly high variation in the condition of the track section 103 has occurred between the individual measurements. If, during a further test run, it is found that an admissible presettable variation regarding the condition of the track section 103 has been exceeded, a new relative loss of service life data record is introduced by the database server 106.2.

Every relative loss of service life data record determined in this way is entered in the memory 106.3 by the database server 106.2 in a manner linked with corresponding time information, which represents to which usage period of the track section 103 the relative loss of service life concerned is applicable.

In order to determine the remaining service life of a certain vehicle component of a vehicle, for example the prior loss of service life (hence, in the case of a new vehicle whose remaining service life is determined for the first time, the value zero) and also amount and point in time of the respective usage of the track section 103 are entered via the computer 108 and transmitted to the database server 106.2. On the basis of the point in time of the respective usage, the database server 106.2 determines the relevant relative loss of service life data record to be applied and, using this, determines the current loss of service life resulting in each case from the actual usage concerned. In summary, then, an entire current loss of service life for the vehicle component concerned (for example, the bogie frame) results from the previous usages of the track section 103 to be considered.

In this case the database server 106.2, already when calculating the current loss of service life for the respective usage of the track section 103, can use the correlation data described above from the memory 106.4. However, it is also possible that these are only considered once the entire current loss of service life is determined.

On the basis of the entire current loss of service life established in this way and the prior loss of service life, the database server 106.2 then determines a residual remaining service life, after the usage observed, of the vehicle component concerned in the case of further usage of the vehicle on the track section 103. This remaining service life can be determined without considering the future progression in the relative loss of service life. Preferably, however, the expected progression of the relative loss of service life of the track section 103 is considered. Consequently an expected increase in the relative loss of service life (through expected wear-contingent degradation of the track covered), can therefore be considered by the database server 106.2 when the remaining service life is determined, for example. In other words, it is therefore possible in an advantageous way, when determining the remaining service life, to also consider the expected progression in the condition of the respective track section (for example, degradation by wear and tear or improvements by planned maintenance measures, etc.).

Preferably it is therefore provided that the database server 106.2, when determining the remaining service life, uses a prognosis for the future progression in the relative loss of service life. The prognosis for the future progression in the relative loss of service life (for the vehicle and the track section 103) can be established in an arbitrary suitable way. Preferably the prognosis is established using the history of the relative loss of service life stored in the memory 106.3 and corresponding prognosis algorithms, which are available in a memory 106.5 of the data control centre 106.

Preferably the operator of the vehicle to be observed, additionally to calculating the (first) remaining service life of the vehicle component concerned for the further usage of the vehicle on the track section 103 used so far, in a similar way can have at least one comparative calculation of a (second) remaining service life of the vehicle component concerned carried out, with the vehicle being used on one or more other track sections (for which corresponding measurement data or relative loss of service life data exist). As a result, planning for the usage of the vehicles, which planning is optimised in respect to the useful life of the vehicles or their components, is possible in an advantageous way.

The present invention has been described above exclusively on the basis of examples in which the remaining service life was calculated in a database server remote from the measuring vehicle 102 to be observed. It goes without saying, however, that in the case of other variants of the invention a different allocation of the computer functions to one or a plurality of other entities may be contemplated. In particular, it can be provided that the remaining service life is also calculated in a processing unit of a vehicle itself (in particular the measuring vehicle 102), which then possibly only needs to be fed with the corresponding measurement data.

Finally, it goes without saying that the invention can be used in conjunction with arbitrary vehicles, in particular arbitrary railway vehicles for arbitrary applications in urban traffic, mainline traffic, in particular in high-speed traffic.

The invention claimed is:

1. A method for determining the remaining service life of a component of a vehicle operated on at least one predefined track section of a track network, said predefined track section having a determined in advance effect on the service life of vehicle components, wherein:
   the remaining service life is determined for a vehicle component of the vehicle mechanically stressed by the interaction between the vehicle and the said track section, after a usage interval of the at least one track section, wherein
   the remaining service life of the vehicle component is determined from a prior loss of service life preset at the beginning of the usage interval for the vehicle component and from a current loss of service life of the vehicle component associated with the usage interval, wherein
   the current loss of service life is determined using an actual captured usage of the at least one track section by the vehicle and a relative loss of service life related to the actual usage of the at least one track section, wherein
   the relative loss of service life has been determined in advance for the at least one track section and at least the type of the vehicle.

2. The method according to claim 1, wherein the relative loss of service life is dependent on the point in time of the usage and,
   when determining the loss of service life, the point in time of a partial quantity of actual usages of the at least one track section by the vehicle is considered in each case.

3. The method according to claim 1, wherein the relative loss of service life was determined using measurements, representative of the stress on the vehicle component, on a measuring vehicle.

4. The method according to claim 3, wherein the measurements, representative of the stress on the vehicle component, were taken in normal transport operation.

5. The method according to claim 3, wherein the measurements, representative of the stress on the vehicle component, were taken on a comparison vehicle, used as a measuring vehicle, of the same vehicle type.

6. The method according to claim 3, wherein the measuring vehicle has a plurality of wheels and components supported thereon via a suspension, and
   the measurements, representative of the stress on the vehicle component, are taken using at least one acceleration sensor, and/or at least one acoustic sensor and/or at least one distance sensor connected in parallel to the suspension between the wheels and the components supported thereon.

7. The method according to claim 6, wherein the measuring vehicle has a running gear with a plurality of wheels and a running gear frame supported via a primary suspension on wheel bearings of the wheels, and
   the measurements, representative of the stress on the vehicle component, are taken using at least two distance sensors, connected in parallel to the primary suspension between the wheels and the running gear frame.

8. The method according to claim 1, wherein the vehicle component whose remaining service life is determined is a running gear component of the vehicle.

9. A method for determining the remaining service life of a component of a vehicle operated on at least one predefined track section of a track network, said predefined track section having a determined in advance effect on the service life of vehicle components, wherein:
   the remaining service life is determined for a vehicle component of the vehicle mechanically stressed by the interaction between the vehicle and the track section, after a usage interval of the at least one track section, wherein
   the remaining service life of the vehicle component is determined from a prior loss of service life preset at the beginning of the usage interval for the vehicle component and from a current loss of service life of the vehicle component associated with the usage interval, wherein
   the current loss of service life is determined using an actual captured usage of the at least one track section by the vehicle and a relative loss of service life related to the actual usage of the at least one track section, wherein
   the relative loss of service life has been determined in advance for the at least one track section and at least the type of the vehicle,
   wherein the relative loss of service life was determined using measurements, representative of the stress on the vehicle component, on a measuring vehicle, wherein the relative loss of service life for the at least one track section is a first relative loss of service life for the at least one first track section, the remaining service life determined using the first relative loss of service life is a first remaining service life for the further operation of the vehicle on the at least one first track section, and using a second relative loss of service life for at least one second track section of the track network, a second remaining service life for the further operation of the vehicle on the at least one second track section is determined, wherein the second relative loss of service life has been determined in advance for the at least one second track section and at least the type of the vehicle.

10. A method for determining the remaining service life of a component of a vehicle operated on at least one predefined track section of a track network, said predefined track section having a determined in advance effect on the service life of vehicle components, wherein:

the remaining service life is determined for a vehicle component of the vehicle mechanically stressed by the interaction between the vehicle and the track section, after a usage interval of the at least one track section, wherein the remaining service life of the vehicle component is determined from a prior loss of service life preset at the beginning of the usage interval for the vehicle component and from a current loss of service life of the vehicle component associated with the usage interval, wherein the current loss of service life is determined using an actual captured usage of the at least one track section by the vehicle and a relative loss of service life related to the actual usage of the at least one track section, wherein the relative loss of service life has been determined in advance for the at least one track section and at least the type of the vehicle, wherein the relative loss of service life is dependent on the point in time of usage, and when determining the remaining service life, a prognosis for the future progression in the relative loss of service life is used, wherein the prognosis for the future progression in the relative loss of service life is determined.

11. A system for determining the remaining service life of a vehicle component of a vehicle operated on at least one predefined track section of a track network, with a data-processing device, which is designed to determine remaining service life data, which are representative of the remaining service life of a vehicle component of the vehicle mechanically stressed by the interaction between the vehicle and the track section, after a usage interval of the at least one track section, said predefined track section having a determined in advance effect on the service life of vehicle components, wherein the initial loss of service life data are representative of a prior loss of service life preset at the beginning of the usage interval for the vehicle component and the current loss of service life data are representative of a current loss of service life of the vehicle component associated with the usage interval, wherein the data-processing device is designed to determine the current loss of service life using usage data and relative loss of service life data, which in each case are stored in the data-processing device, wherein the usage data are representative of a previously captured actual usage of the at least one track section by the vehicle, the relative loss of service life data are representative of a relative loss of service life related to the actual usage of the at least one track section and the relative loss of service life data have been determined in advance for the at least one track section and at least the type of the vehicle.

12. The system according to claim 11, wherein the relative loss of service life data for a plurality of points in time of usage in each case comprise a loss of service life data record linked with an identifier for the point in time of usage, and the data-processing device, when determining the loss of service life, is designed to consider in each case the point in time of a partial quantity of actual usages of the at least one track section by the vehicle.

13. The system according to claim 11, wherein the vehicle component whose remaining service life is to be determined is a running gear component of the vehicle.

14. A measuring vehicle, for a system according to claim 11, with a running gear having at least two wheel units, which in each case comprise two wheels, a vehicle unit supported via a suspension on wheel bearings of the wheels of both wheel units, and a measuring device, wherein the measuring device for gathering stress data of a vehicle component of the measuring vehicle has at least four distance sensors, wherein at least one distance sensor, which is connected in parallel to the suspension between the respective wheel and the vehicle unit, is associated with each of the wheels of both wheel units.

15. The measuring vehicle according to claim 14, wherein the measuring device comprises at least one acceleration sensor and/or at least one acoustic sensor.

16. The measuring vehicle according to claim 15, wherein the measuring device comprises a first control device and a second control device, wherein the respective sensor of the measuring device is designed to gather and pass the stress data on to the first control device, the first control device is designed to collect, pre-process and pass the stress data on to the second control device, and the second control device is designed to collect, further process and pass the stress data on to a data-processing device.

17. The measuring vehicle according to claim 16, wherein the respective sensor of the measuring device and the first control device are connected by a first data bus and/or the first control device and the second control device are connected by a second data bus.

18. The measuring vehicle according to claim 16, wherein the first control device is arranged spatially close to the at least one sensor.

19. The measuring vehicle according to claim 16, wherein the first control device is designed to convert the stress data of the at least one sensor into a standard format and to pass these on formatted in such a way.

20. The measuring vehicle according to claim 16, wherein a plurality of different stress data to be recorded can be preset, and the first control device, as a function of a parameter of the stress data to be gathered, is designed to trigger different sensors of the measuring device in order to pass on the stress data recorded thereby.

21. The measuring vehicle according to claim 14, wherein the measuring device is designed to record the stress data in normal transport operation of the measuring vehicle.

22. The measuring vehicle according to claim 14, wherein
the measuring device comprises a position-recording device, which is designed to record the position of the measuring vehicle at the point in time of gathering the respective stress data and to link the stress data with a position identifier, and/or
the measuring device comprises a time-recording device, which is designed to record the point in time of gathering the respective stress data and to link the stress data with a time identifier.

23. The measuring vehicle according to claim 14, wherein the vehicle component, for which the stress data are to be collected, is a running gear component of the measuring vehicle.

24. A system for determining the remaining service life of a vehicle component of a vehicle operated on at least one predefined track section of a track network, with a data-processing device, which is designed
to determine remaining service life data, which are representative of the remaining service life of a vehicle component of the vehicle mechanically stressed by the interaction between the vehicle and the track section, after a usage interval of the at least one track section, said predefined track section having a determined in advance effect on the service life of vehicle components, wherein
the remaining service life data of the vehicle component are determined from initial loss of service life data and current loss of service life data, which are stored in the data-processing device, wherein
the initial loss of service life data are representative of a prior loss of service life preset at the beginning of the usage interval for the vehicle component and the current loss of service life data are representative of a current loss of service life of the vehicle component associated with the usage interval, wherein
the data-processing device is designed to determine the current loss of service life using usage data and relative loss of service life data, which in each case are stored in the data-processing device, wherein
the usage data are representative of a previously captured actual usage of the at least one track section by the vehicle,
the relative loss of service life data are representative of a relative loss of service life related to the actual usage of the at least one track section and
the relative loss of service life data have been determined in advance for the at least one track section and at least the type of the vehicle,
wherein the relative loss of service life data for the at least one track section are first relative loss of service life data for the at least one first track section,
the remaining service life data determined using the first relative loss of service life data are first remaining service life data for the further operation of the vehicle on the at least one first track section, and
the data-processing device is designed to determine second remaining service life data, using stored second relative loss of service life data for at least one second track section of the track network, which are representative of a remaining service life with further operation of the vehicle on the at least one second track section, wherein
the second relative loss of service life data have been determined in advance for the at least one second track section and at least the type of the vehicle.

25. A system for determining the remaining service life of a vehicle component of a vehicle operated on at least one predefined track section of a track network, with a data-processing device, which is designed
to determine remaining service life data, which are representative of the remaining service life of a vehicle component of the vehicle mechanically stressed by the interaction between the vehicle and the track section, after a usage interval of the at least one track section, said predefined track section having a determined in advance effect on the service life of vehicle components, wherein
the remaining service life data of the vehicle component are determined from initial loss of service life data and current loss of service life data, which are stored in the data-processing device, wherein
the initial loss of service life data are representative of a prior loss of service life preset at the beginning of the usage interval for the vehicle component and the current loss of service life data are representative of a current loss of service life of the vehicle component associated with the usage interval, wherein
the data-processing device is designed to determine the current loss of service life using usage data and relative loss of service life data, which in each case are stored in the data-processing device, wherein
the usage data are representative of a previously captured actual usage of the at least one track section by the vehicle,
the relative loss of service life data are representative of a relative loss of service life related to the actual usage of the at least one track section and
the relative loss of service life data have been determined in advance for the at least one track section and at least the type of the vehicle,
wherein the relative loss of service life data are dependent on the point in time of usage and
the data-processing device, when determining the remaining service life data, is designed to use a prognosis for the future progression in the relative loss of service life, wherein
the data-processing device is designed to establish the prognosis for the future progression in the relative loss of service life data.

26. A system for determining the remaining service life of a vehicle component of a vehicle operated on at least one predefined track section of a track network, with a data-processing device, which is designed
to determine remaining service life data, which are representative of the remaining service life of a vehicle component of the vehicle mechanically stressed by the interaction between the vehicle and the track section, after a usage interval of the at least one track section, said predefined track section having a determined in advance effect on the service life of vehicle components, wherein
the remaining service life data of the vehicle component are determined from initial loss of service life data and current loss of service life data, which are stored in the data-processing device, wherein
the initial loss of service life data are representative of a prior loss of service life preset at the beginning of the usage interval for the vehicle component and the current loss of service life data are representative of a current loss of service life of the vehicle component associated with the usage interval, wherein
the data-processing device is designed to determine the current loss of service life using usage data and relative loss of service life data, which in each case are stored in the data-processing device, wherein
the usage data are representative of a previously captured actual usage of the at least one track section by the vehicle,
the relative loss of service life data are representative of a relative loss of service life related to the actual usage of the at least one track section and
the relative loss of service life data have been determined in advance for the at least one track section and at least the type of the vehicle,
wherein a measuring vehicle is equipped with a measuring device that can be connected to the data-processing device, wherein
the measuring device for determining the relative loss of service life is designed to take measurements, representative of the stress on the vehicle component, on the measuring vehicle during at least one transit through the at least one track section.

27. The system according to claim 26, wherein
the measuring device is designed to gather stress data, representative of the stress on the vehicle component, and to pass these on to the data-processing device, and
the data-processing device is designed to determine the relative loss of service life data using the stress data.

28. The system according to claim 26, wherein the measuring device is designed to record the stress data in normal transport operation of the measuring vehicle.

29. The system according to claim 26, wherein the measuring device is arranged on a comparison vehicle, used as a measuring vehicle, of the same vehicle type.

30. The system according to claim 26, wherein the measuring vehicle has a plurality of wheels and components supported thereon via a suspension, and
the measuring device for gathering the stress data has at least one acceleration sensor and/or at least one acoustic sensor and/or at least one distance sensor connected in parallel to the suspension between the wheels and the components supported thereon.

31. The system according to claim 30, wherein the measuring vehicle has a running gear with a plurality of wheels and a running gear frame supported via a primary suspension on wheel bearings of the wheels, and
the measuring device comprises at least two, preferably at least four, distance sensors connected in parallel to the primary suspension between the wheels and the running gear frame.

32. The system according to claim 26, wherein
the measuring device comprises at least one sensor, a first control device and a second control device, wherein
the at least one sensor is designed to gather and pass the stress data on to the first control device,
the first control device is designed to collect, pre-process and pass the stress data on to the second control device, and
the second control device is designed to collect, further process and pass the stress data on to the data-processing device.

33. The system according to claim 32, wherein the at least one sensor and the first control device are connected by a first data bus and/or the first control device and the second control device are connected by a second data bus.

34. The system according to claim 32, wherein the first control device is arranged spatially close to the at least one sensor.

35. The system according to claim 32, wherein the first control device is designed to convert the stress data of the at least one sensor into a standard format and to pass these on formatted in such a way.

36. The system according to claim 32, wherein
the measuring device comprises a plurality of sensors,
a plurality of different stress data to be gathered can be preset, and
the first control device, as a function of a parameter of the stress data to be gathered, is designed to trigger different sensors of the plurality of sensors in order to pass on the stress data recorded thereby.

37. The system according to claim 26, wherein
the measuring device comprises a position-recording device, which is designed to record the position of the measuring vehicle at the point in time of gathering the respective stress data and to link the stress data with a position identifier, and/or
the measuring device comprises a time-recording device, which is designed to record the point in time of gathering the respective stress data and to link the stress data with a time identifier.

38. The system according to claim 26, wherein the data-processing device is designed to determine status data, representative of the status of the at least one track section, from the measurement data of the measuring device.

* * * * *

UNITED STATES PATENT AND TRADEMARK OFFICE
CERTIFICATE OF CORRECTION

PATENT NO. : 8,504,225 B2  Page 1 of 1
APPLICATION NO. : 12/738921
DATED : August 6, 2013
INVENTOR(S) : Bieker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this

Fifteenth Day of September, 2015

Michelle K. Lee
*Director of the United States Patent and Trademark Office*